United States Patent
Verma et al.

(10) Patent No.: US 8,724,469 B2
(45) Date of Patent: May 13, 2014

(54) METHOD AND DEVICE FOR SENDING PACKETS ON A WIRELESS LOCAL AREA NETWORK

(75) Inventors: Lochan Verma, Seoul (KR); Hakirat Singh, Santa Clara, CA (US); Julan Hsu, San Jose, CA (US); Seong-Wook Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 93 days.

(21) Appl. No.: 13/362,141

(22) Filed: Jan. 31, 2012

(65) Prior Publication Data

US 2012/0127981 A1 May 24, 2012

Related U.S. Application Data

(63) Continuation of application No. PCT/KR2010/005036, filed on Jul. 30, 2010.

(60) Provisional application No. 61/230,187, filed on Jul. 31, 2009.

(51) Int. Cl.
*G01R 31/08* (2006.01)
*H04W 74/08* (2009.01)
*H04W 28/10* (2009.01)
*H04W 28/18* (2009.01)
*H04W 84/12* (2009.01)

(52) U.S. Cl.
CPC ............. *H04W 74/08* (2013.01); *H04W 28/10* (2013.01); *H04W 28/18* (2013.01); *H04W 84/12* (2013.01)
USPC .......................... 370/235; 370/395.4; 370/468

(58) Field of Classification Search
CPC .............................. H04W 74/08; H04W 28/10
USPC ................................ 370/338, 235, 395.4, 468
See application file for complete search history.

(56) References Cited

U.S. PATENT DOCUMENTS

| | | | |
|---|---|---|---|
| 2002/0010938 A1 | 1/2002 | Zhang et al. | |
| 2005/0036448 A1 | 2/2005 | Leeuwen | |
| 2006/0164987 A1 | 7/2006 | Ruiz Floriach et al. | |
| 2008/0095124 A1 | 4/2008 | Ramos et al. | |
| 2008/0101308 A1 | 5/2008 | Gaur | |
| 2009/0059949 A1* | 3/2009 | Singh et al. | 370/447 |

FOREIGN PATENT DOCUMENTS

| KR | 10-2005-0094050 A | 9/2005 |
|---|---|---|
| KR | 10-0537499 B1 | 12/2005 |

OTHER PUBLICATIONS

Chebrolu, Kameswari et al., "Selective Frame Discard for Interactive Video", 2004, 6 pages.

(Continued)

*Primary Examiner* — Sai-Ming Chan
(74) *Attorney, Agent, or Firm* — Sughrue Mion, PLLC

(57) ABSTRACT

Provided are a method and an apparatus for transmitting a packet in a wireless local area network (LAN), the method including determining whether a packet, which does not expire during the current transmission opportunity (TXOP) but will expire before a next TXOP is secured, exists or not based on a time-to-live (TTL) of the packet; if it is determined that the packet does not expire during an expansion of the current TXOP, expanding the current TXOP; and transmitting the packet to a receiving station.

15 Claims, 5 Drawing Sheets

(56) References Cited

OTHER PUBLICATIONS

Gurtov, Andrei et al., "Lifetime Packet Discard for Efficient Real-Time Transport over Cellular Links", Nov. 26, 2003, pp. 1-14.

International Search Report (PCT/ISA/210) dated Apr. 18, 2011, issued in International Application No. PCT/KR2010/005036.

Li, Qiong et al., "Providing Adaptive QoS to Layered Video Over Wireless Local Area Networks Through Real-Time Retry Limit Adaptation", IEEE Transactions on Multimedia, vol. 6, No. 2, Apr. 2004, pp. 278-290.

Lu, Mei-Hsuan et al., "Video Streaming Over 802.11 WLAN with Content-Aware Adaptive Retry", IEEE 2005, 4 pages.

Ro, K.H. et al., "Trends of QoS Standardization for 3GPP-WLAN Interworking", Jun. 30, 2006, pp. 100-108.

Written Opinion (PCT/ISA/237) dated Apr. 18, 2011, issued in International Application No. PCT/KR2010/005036.

* cited by examiner

METHOD AND DEVICE FOR SENDING PACKETS ON A WIRELESS LOCAL AREA NETWORK

CROSS-REFERENCE TO RELATED APPLICATION

This application is a Continuation Application of International Application No. PCT/KR2010/005036, filed Jul. 30, 2010, which claims priority from U.S. Provisional Application No. 61/230,187, filed on Jul. 31, 2009, the disclosure of which are incorporated by reference in their entireties.

BACKGROUND

1. Field

The exemplary embodiments relate to a method and apparatus for transmitting a packet in a wireless local area network (LAN), and more particularly, to a method and apparatus for transmitting a packet in a wireless local area network (LAN), the method and the apparatus supporting quality of service (QoS) by assuring transmission opportunity (TXOP) with respect to a delay-sensitive packet satisfying an end-to-end latency constraint based on time-to-live (TTL) of a packet or priority of the packet.

2. Description of the Related Art

Since standards for a wireless local area network (LAN) exhibit a transmission rate from about 1 Mbps to about 2 Mbps in IEEE 802.11 WG, technologies related to wireless LAN have been continuously developed, and, recently, standards supporting a high speed data transmission rate above 100 Mbps have been established.

Recently, in the wireless communication fields, application services for transmitting various multimedia data at high speed are increasing, and the potential of the markets related to consumer electronics (CEs) supporting such services is also increasing.

In response to such market demands, IEEE 802.11e has standardized wireless quality of service (QoS) medium access control (MAC) for supporting distinguished services, such as high speed transmission of various multimedia data.

SUMMARY

According to an exemplary embodiment there is provided a method and an apparatus for transmitting a packet in a wireless local area network (LAN), the method and the apparatus supporting quality of service (QoS) by assuring transmission opportunity (TXOP) with respect to a delay-sensitive packet satisfying an end-to-end latency constraint based on time-to-live (TTL) of a packet or priority of the packet.

An aspect of the exemplary embodiment also provides a computer readable recording medium having recorded thereon a computer program for implementing the method.

According to an aspect of the exemplary embodiment, there is provided a method of transmitting a packet in a wireless local area network (LAN), the method including determining whether a packet, which does not expire during the current transmission opportunity (TXOP) but will expire before a next TXOP is secured, exists or not, based on a time-to-live (TTL) of the packet; if it is determined that the packet does not expire during expansion of the current TXOP, selectively expanding the current TXOP; and transmitting the packet to a receiving station.

In selectively expanding the current TXOP, a clear to send (CTS)-To-Self packet is transmitted.

The selective expanding of the current TXOP is performed before or at the expiration of the current TXOP.

In the transmitting of the packet to the receiving station, the packet is transmitted to the receiving station based on a user priority corresponding to a best effort (BE) access category (AC) during the expanded TXOP.

The method further includes receiving an acknowledgement (ACK) packet from the receiving station, which informs a transmitting station that the receiving station has received a transmitted packet.

The method is performed at an access point (AP) or a transmitting station.

The wireless LAN complies with IEEE 802.11e standards assuring quality of service (QoS).

According to another aspect of the exemplary embodiment, there is provided a computer readable recording medium having recorded thereon a computer program for implementing the method.

According to another aspect of the exemplary embodiment, there is provided a transmitting station in a wireless local area network (LAN), the transmitting station including a determining unit, which determines whether a packet, which does not expire during the current transmission opportunity (TXOP) but will expire after a next TXOP is secured, exists or not, based on a time-to-live (TTL) of the packet; a TXOP expanding unit, which selectively expands the current TXOP, if it is determined that the packet does not expire during expansion of the current TXOP; and a transmitting unit, which transmits the packet to a receiving station.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which.

DETAILED DESCRIPTION OF EXEMPLARY EMBODIMENTS

Figure 1:
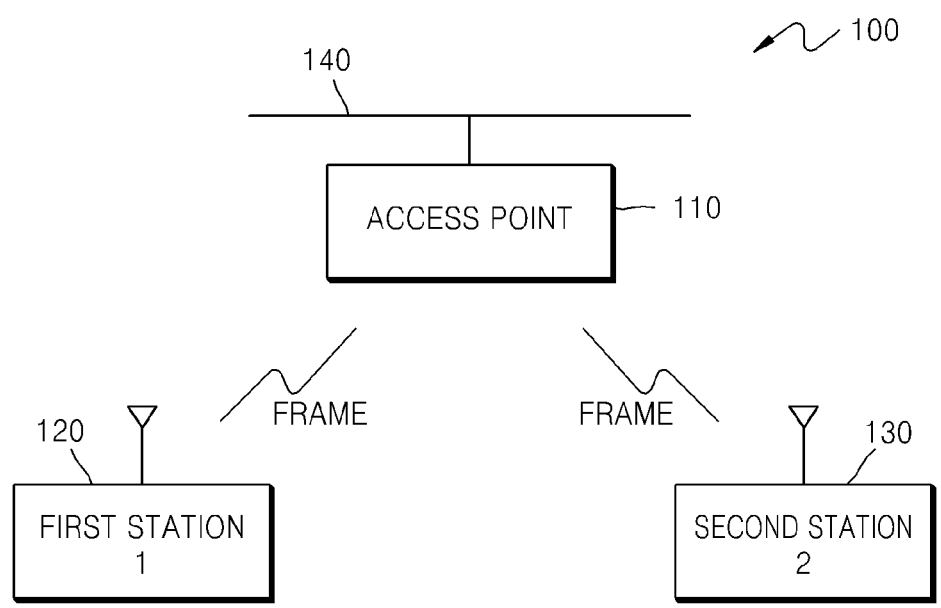
FIG. 1 is a diagram showing a wireless local area network (LAN) 100 including an access point (AP) and stations.

Hereinafter, the exemplary embodiments will be described in detail by explaining exemplary embodiments with reference to the attached drawings. Like reference numerals in the drawings denote like elements. In the drawings, the thicknesses of layers and regions are exaggerated for clarity.

FIG. 1 is a diagram showing a wireless local area network (LAN) 100 including an access point (AP) 110 and stations.

The wireless LAN 100 includes an AP 110, a first station 120, and a second station 130. The wireless LAN 100 may be embodied using an IEEE 802.11a/b/g network, an IEEE 802.11e network assuring quality of service (QoS), or any other suitable wireless network technique.

The AP 110 is also referred to as an access node or a wireless bridge and performs data communication with the stations 120 and 130 wirelessly. For example, when the first station 120 transmits data to the second station 130, the transmitted data is first received by the AP 110, and then the AP 110 transmits the received data to the second station 120. In other words, the AP 100 functions as a bridge between the stations 120 and 130. The AP 110 is connected to a backbone network 140 by wire or wirelessly. The backbone network 140 may be embodied by using Ethernet or any of other suitable wireless network technique as stated above.

The stations 120 and 130 are also referred to as final terminals, client terminals, client devices, or clients. The stations 120 and 130 may be, for example, personal computers (PCs) (such as desktops, laptops, palmtops, etc.), mobile phones, or mobile communication devices, such as mobile handheld PCs, wallet PCs, and personal digital assistants (PDAs).

Figure 2:
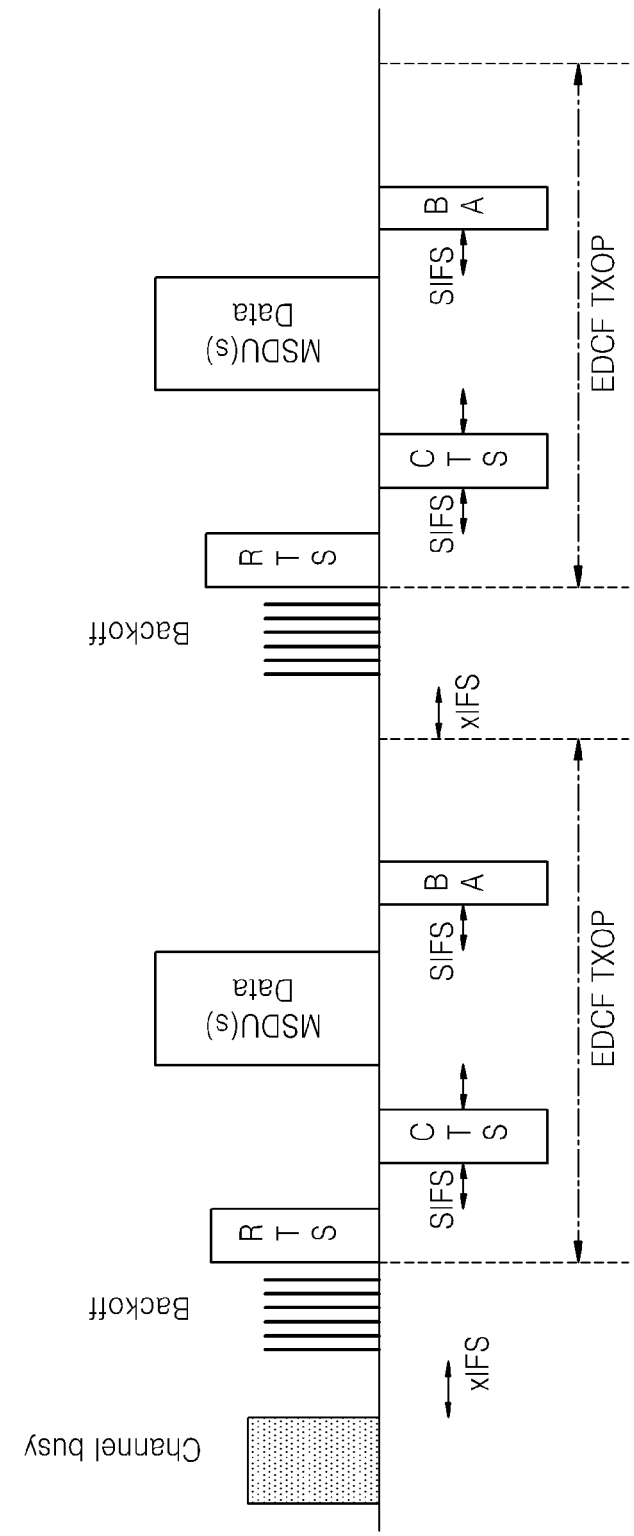
FIG. 2 is a diagram showing frame sequences transmitted between a transmitting station and a receiving station.

FIG. 2 is a diagram of an Enhanced Distribution Coordination Function (EDCF) of a TXOP showing frame sequences of a transmitted between a transmitting station and a receiving station.

A medium access control (MAC) protocol of the wireless LAN 100 basically defines a carrier sense multiple access/collision avoidance (CSMA/CA) method. The CSMA/CA method employs a competition-based MAC method in a distributed environment without a centralized controller.

All stations compete for access to a channel. Before a new transmission begins, each station performs a random backoff after a period of time corresponding to a predetermined inter-frame space. The term 'backoff' refers to an algorithm for settling competition between stations attempting to access a same medium. Based on the backoff algorithm, each station selects a random number n and waits n number of slots before the corresponding station attempts to access a medium.

The predetermined inter-frame space is defined based on various traffic classes suggested in IEEE 802.11e. Since the predetermined inter-frame space xIFS and the backoff algorithm comply with the IEEE 802.11e standards, detailed descriptions thereof will be omitted here.

After it is determined that a channel is in idle during a predetermined inter-frame space and a backoff period, a station secures a transmission opportunity (referred to hereinafter as TXOP), which is a bounded time interval in which stations supporting Quality of Service are permitted to transfer a series of frames. A TXOP may be defined by a start time and a maximum duration. The transmitting station transmits a short control packet, which is referred to as request to send (RTS), to the receiving station. After short inter-frame spaces (SIFS), which are time periods used to distinguish each packet transmission, if an accessing medium is available, the receiving station responds to the RTS by transmitting a response control packet, which is referred to as clear to send (CTS), to the transmitting station.

The transmitting station transmits a packet to the receiving station after the CTS is received. The receiving station transmits an ACK control packet (referred to hereinafter as an ACK packet), which informs the transmitting station that the receiving station has received a packet transmitted from the transmitting station. The ACK packet may be either a block ACK packet with respect to a whole packet or, in the case where the whole packet is fragmented, a normal ACK packet with respect to each of fragments. The transmitting station competes again to access a channel for transmitting a next packet.

The total time overhead for transmitting a packet may be expressed as shown in Equation 1 below.

$$\text{Delay}_{WeightedAvg}+\text{xIFS}+\text{Backoff}_{Avg}+2\times\text{SIFS}+T_{RTS\text{-}CTS}+\text{SIFS} \quad [\text{Equation 1}]$$

$\text{Delay}_{WeightedAvg}$ indicates an average moving delay time between successive TXOPs. xIFS and $\text{Backoff}_{Avg}$ indicate a predetermined inter-frame space and an average backoff period between new transmissions of each station, respectively. 2×SIFS indicates two short inter-frame spaces between the exchange of RTS and CTS and packet transmission after receipt of CTS. $T_{RTS\text{-}CTS}$ indicates a period of time taken to exchange the RTS and CTS.

Figure 3:
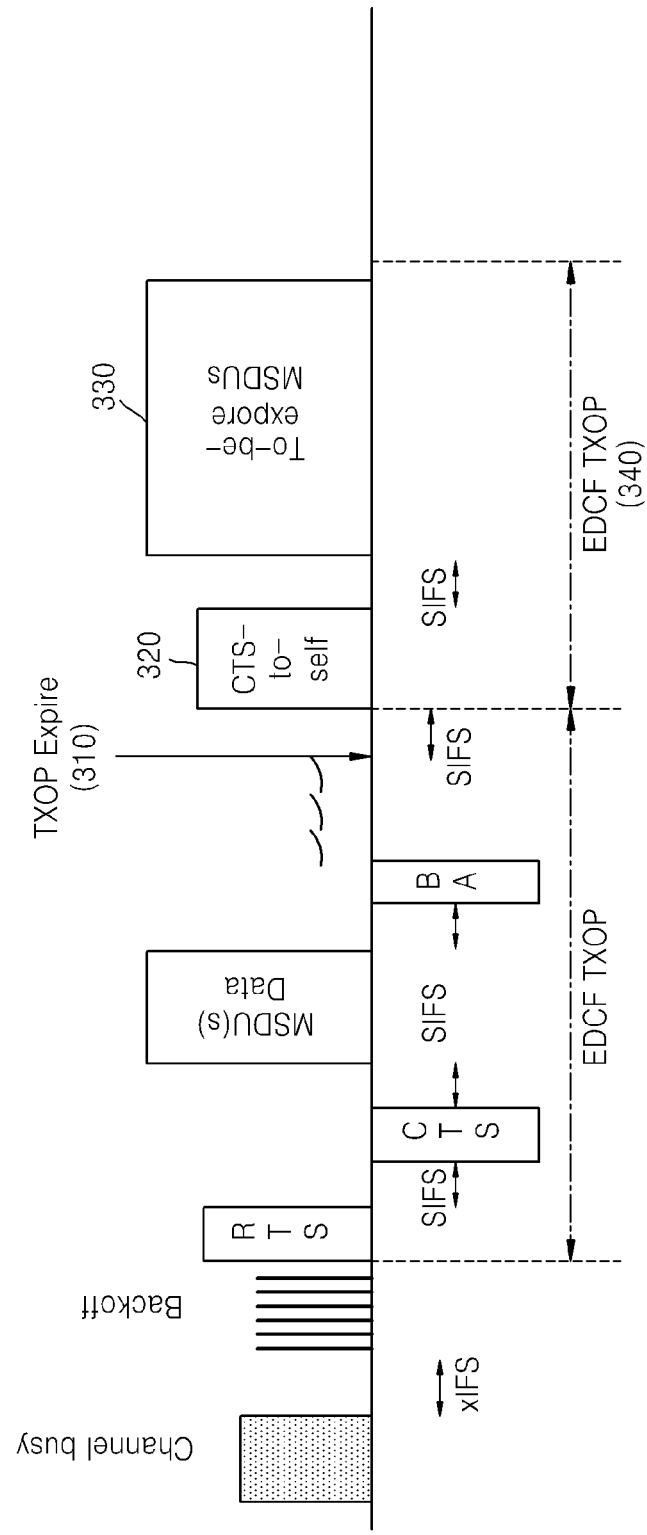
FIG. 3 is a diagram showing frame sequences for packet transmission according to an exemplary embodiment.

FIG. 3 is a diagram showing frame sequences for packet transmission according to an exemplary embodiment.

A transmitting station, which has secured a current TXOP, determines whether a packet 330, which does not expire during the current TXOP but will expire before a next TXOP is secured, exists or not, based on time-to-live (TTL) of packets.

If the packet 330, which does not expire during the current TXOP but will expire before a next TXOP is secured, exists, the transmitting station expands the current TXOP if the packet 330 does not expire while the current TXOP is being expanded.

A transmitting station 600 may expand the current TXOP before or at expiration 310 of the current TXOP. Although the current TXOP is expanded before or at the expiration 310 of the current TXOP in the exemplary embodiment, the current TXOP may also be expanded at other points of time.

The transmitting station 600 may perform expansion 340 of the current TXOP by transmitting a CTS-To-Self packet 320. Although the CTS-To-Self packet 320 is used to expand the current TXOP in the present embodiment, other packets may also be used to expand the current TXOP.

Equation 2 below defines conditions for expanding the current TXOP.

$$2\times\text{SIFS}+T_{CTSToSelf}$$
$$<\text{MSDU}_{ExpiryTime\text{-}CurrentTime}$$
$$<\text{Delay}_{WeightedAvg}+\text{xIFS}+\text{Backoff}_{Avg}+2\times\text{SIFS}+T_{RTS\text{-}CTS}+\text{SIFS} \quad [\text{Equation 2}]$$

$\text{MSDU}_{ExpiryTime\text{-}CurrentTime}$ indicates the TTL of a packet. $2\times\text{SIFS}+T_{CTSToSelf}$ indicates a period of time taken to expand the current TXOP. $\text{Delay}_{WeightedAvg}+\text{xIFS}+\text{Backoff}_{Avg}+2\times\text{SIFS}+T_{RTS\text{-}CTS}+\text{SIFS}$ indicates a period of time taken to secure a next TXOP.

Therefore, according to Equation 2, if it is determined based on the TTL of the packets that the packet 330, which does not expire during the current TXOP but will expire before a next TXOP is secured, exists and the packet 330 does not expire during expansion of the current TXOP, a transmitting station expands the current TXOP before or after the expiration 310 of the current TXOP.

During the expanded TXOP, a transmitting station transmits packets. The transmitting station may transmit packets to a receiving station based on a user priority corresponding to a best effort (BE) access category (AC) during the expanded TXOP.

Next, the transmitting station receives an ACK packet from the receiving station, which informs the transmitting station that the receiving station has received a packet transmitted from the transmitting station. According to the exemplary embodiments, a collision due to another station, which has failed to receive a CTS-To-Self packet, may be avoided by transmitting packets based on a BE AC and receiving an ACK packet based on a BE AC.

According to an exemplary embodiment, a transmitting station determines whether to expand the current TXOP and transmit packets or not based on the TTL and priorities of packets and selectively transmits packets according to a result of the determination, and thus QoS may be assured in multimedia data transmission. In the present embodiment, QoS may be assured by assuring expanded TXOP with respect to a delay-sensitive packet satisfying an end-to-end latency constraint, where it is not necessary to know properties, inter-packet intervals, or estimated time of reception at a receiving station with respect to multimedia data in advance.

Furthermore, the exemplary embodiment may be identically applied to all stations within the wireless LAN 100, and thus unfairness between stations may be eliminated. In the exemplary embodiment, a transmitting station transmits packets and receives an ACK packet during a TXOP expanded based on a BE AC, and thus a collision due to another station ignorant of the expansion of the TXOP may be avoided.

Figure 4:
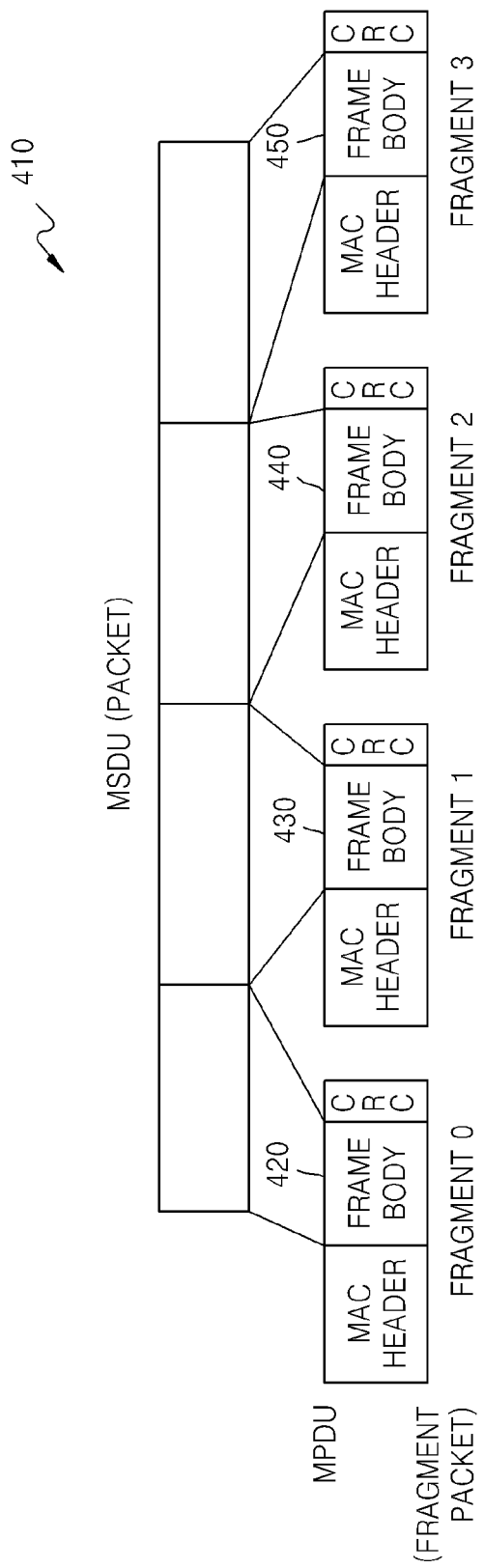
FIG. 4 is a diagram showing formats of a whole packet and a fragment packet.

FIG. 4 is a diagram showing formats of a whole packet and a fragment packet.

According to an aspect of an exemplary embodiment, in a network such as an IEEE 802.11 network, a MAC service data unit (MSDU) 410 is generally divided into a plurality of smaller packets, that is, fragments 420 through 450 before transmission. Each of the fragments is generally referred to as a MAC protocol data unit (MPDU). The terms 'fragment packet' and 'fragment' are used interchangeably herein.

Generally, each of the fragments MPDU 420 through 450 has the same data format as the whole data packet MSDU 410. A destination device recombines received fragment packets. The division and recombination are referred to as a link adaptation method, because the method is used to provide a more reliable link by transmitting (smaller) fragment packets. The method further reduces chances of packet loss due to noise (loss is more likely to occur with respect to a larger packet), and loss of bandwidth may also be reduced due to small size of packets. Furthermore, even if a fragment is lost, a relatively small amount of data is lost as compared to loss during transmission of a whole packet.

Figure 5:
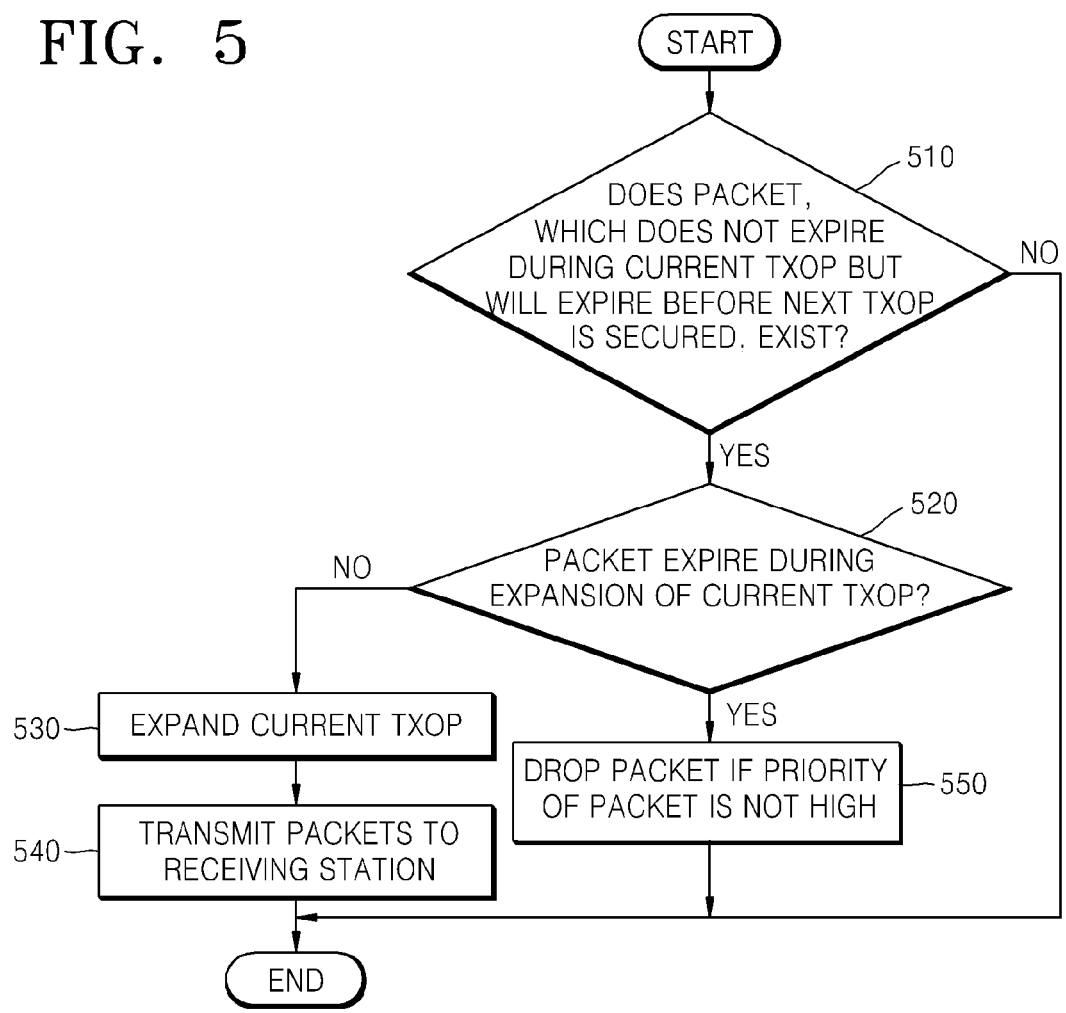
FIG. 5 is a flowchart showing packet transmission in a wireless LAN according to an exemplary embodiment.

FIG. 5 is a flowchart showing packet transmission in a wireless LAN according to an exemplary embodiment.

In an operation 510, the transmitting station 600, which has secured the current TXOP, determines whether a packet, which does not expire during the current TXOP but will expire before a next TXOP is secured, exists or not, based on the TTL of the packet. The transmitting station 600 includes an AP.

The wireless LAN 100 including the transmitting station 600 may be embodied by using an IEEE 802.11a/b/g network, an IEEE 802.11e network assuring QoS, or any other suitable wireless network technique.

If a packet, which does not expire during the current TXOP but will expire before a next TXOP is secured, exists, the process proceeds to operation 520. If not, the process is terminated.

Prior to operation 510, in the case where a packet expires during the current TXOP or a packet does not expire during the current TXOP and will not expire before a next TXOP is secured, the transmitting station 600 either drops the packet or transmits an amount of the packet that may be transmitted during the current TXOP and transmits the remaining amount of the packet during a next TXOP. Operations prior to operation 510 comply with the IEEE 802.11e standards, and thus a detailed description thereof will be omitted here.

In operation 520, the transmitting station 600 determines whether a packet expires during expansion of the current TXOP or not. If it is determined that the packet expires during expansion of the current TXOP, the process proceeds to operation 550. If not, the process proceeds to operation 530.

In operation 530, the transmitting station 600 expands the current TXOP. The transmitting station 600 may expand the current TXOP before or at expiration of the current TXOP. Although the current TXOP is expanded before or at the expiration of the current TXOP in the present embodiment, the current TXOP may be expanded at other points of time.

The transmitting station 600 may perform expansion of the current TXOP by transmitting a CTS-To-Self packet. Although a CTS-To-Self packet is used to expand the current TXOP in the present embodiment, other packets may be used to expand the current TXOP.

In an operation 540, the transmitting station 600 transmits packets during the expanded TXOP. The transmitting station 600 may transmit packets to a receiving station based on a user priority corresponding to a BE AC during the expanded TXOP. Next, the transmitting station 600 receives an ACK packet from the receiving station, which informs the transmitting station 600 that the receiving station has received a packet transmitted from the transmitting station 600. According to exemplary embodiments, a collision due to another station, which has failed to receive a CTS-To-Self packet, may be avoided by transmitting packets based on a BE AC and receiving an ACK packet based on a BE AC.

In operation 550, if the priority of a packet is not high, the transmitting station 600 drops the packet. Although an algorithm in which the transmitting station 600 drops a packet if the priority of the packet is not high is used in operation 550, another algorithm may be used in operation 550.

Figure 6:
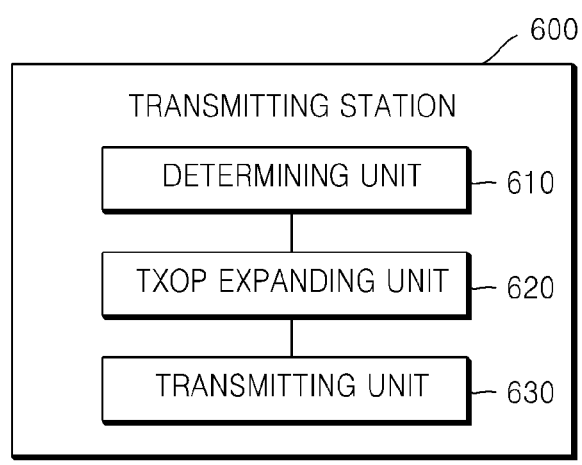
FIG. 6 is a block diagram of a transmitting station in a wireless LAN according to an exemplary embodiment.

FIG. 6 is a block diagram of the transmitting station 600 in a wireless LAN according to an exemplary embodiment.

The transmitting station 600 includes a determining unit 610, a TXOP expanding unit 620, and a transmitting unit 630. The transmitting station 600 also includes an AP. The wireless LAN 100 including the transmitting station 600 may be embodied by using an IEEE 802.11a/b/g network, an IEEE 802.11e network assuring QoS, or any other suitable wireless network technique.

The determining unit 610 determines whether a packet, which does not expire during the current TXOP but will expire before a next TXOP is secured, exists or not, based on the TTL of packets.

If a packet, which does not expire during the current TXOP but will expire before a next TXOP is secured, exists and the packet will not expire during expansion of the current TXOP, the TXOP expanding unit 620 expands the current TXOP.

The TXOP expanding unit 620 may expand the current TXOP before or at expiration of the current TXOP. Although the current TXOP is expanded before or at the expiration of the current TXOP in the present embodiment, the current TXOP may be expanded at other points of time.

The TXOP expanding unit 620 may perform expansion of the current TXOP by transmitting a CTS-To-Self packet. Although a CTS-To-Self packet is used to expand the current TXOP in the present embodiment, other packets may be used to expand the current TXOP.

The transmitting unit 630 transmits packets during the expanded TXOP. The transmitting unit 630 may transmit packets to a receiving station based on a user priority corresponding to a BE AC during the expanded TXOP.

The transmitting station 600 may further include a reception confirming unit (not shown). The reception confirming unit receives an ACK packet from the receiving station, which informs the transmitting station 600 that the receiving station has received a transmitted packet.

According to exemplary embodiments, as the transmitting unit 630 transmits based on a BE AC and the reception confirming unit receives an ACK packet, a collision due to another station, which has failed to receive a CTS-To-Self packet, may be avoided.

The transmitting station 600 may further include a dropping unit (not shown). When a packet, which does not expire during the current TXOP but will expire before a next TXOP is secured, exists, if the packet expires during expansion of the current TXOP and the priority of the packet is not high, the dropping unit drops the packet. Although an algorithm in which a packet is dropped if the priority of the packet is not high is used, another algorithm may also be used.

On the other hand, in the case where a packet expires during the current TXOP, the dropping unit may drop the packet. Meanwhile, if a packet does not expire during the current TXOP and will not expire before a next TXOP is secured, the transmitting unit 630 may transmit an amount of the packet that may be transmitted during the current TXOP and transmit the remaining amount of the packet during a next TXOP. Operations performed in the case where a packet expires during the current TXOP or a packet does not expire during the current TXOP and will not expire before a next TXOP is secured comply with the IEEE 802.11e standards, and thus a detailed description thereof will be omitted here.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

For example, the transmitting station 600 according to an exemplary embodiment may include buses coupled to each unit of the device as shown in FIG. 6, at least one processor coupled to the buses, and a memory, which is coupled to the buses to store a received message or a generated message and is coupled to the at least one processor for performing instructions as stated above.

Exemplary embodiments can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

What is claimed is:

1. A method of transmitting a packet in a wireless local area network (LAN), the method comprising:
   determining whether a packet, which does not expire during a current transmission opportunity (TXOP) and will expire before a next TXOP is secured, exists or not based on a time-to-live (TTL) of the packet;
   if it is determined that the packet does not expire during an expansion of the current TXOP, expanding the current TXOP; and
   transmitting the packet to a receiving station.

2. The method of claim 1, wherein in the expanding of the current TXOP, a clear to send (CTS)-To-Self packet is transmitted.

3. The method of claim 1, wherein the expanding of the current TXOP is performed before or at an expiration of the current TXOP.

4. The method of claim 1, wherein in the transmitting of the packet to the receiving station, the packet is transmitted to the receiving station based on a user priority corresponding to a best effort (BE) access category (AC) during the expanded current TXOP.

5. The method of claim 1, further comprising:
   receiving an ACK packet from the receiving station which informs a transmitting station that the receiving station has received the transmitted packet.

6. The method of claim 1, wherein the method is performed at an access point (AP) or a transmitting station.

7. The method of claim 1, wherein the wireless LAN complies with an IEEE 802.11e standard regarding quality of service (QoS).

8. A transmitting station in a wireless local area network (LAN), the transmitting station comprising:
   a determining unit which determines whether a packet, which does not expire during a current transmission opportunity (TXOP) and will expire after a next TXOP is secured, exists or not based on a time-to-live (TTL) of the packet;
   a TXOP expanding unit which expands the current TXOP, if it is determined that the packet does not expire during an expansion of the current TXOP; and
   a transmitting unit which transmits the packet to a receiving station.

9. The transmitting station of claim 8, wherein the TXOP expanding unit transmits a clear to send (CTS)-To-Self packet.

10. The transmitting station of claim 8, wherein the TXOP expanding unit expands the current TXOP before or at an expiration of the current TXOP.

11. The transmitting station of claim 8, wherein the transmitting unit transmits the packet to the receiving station based on a user priority corresponding to a best effort (BE) access category (AC).

12. The transmitting station of claim 8, further comprising a reception confirming unit which receives an ACK packet from the receiving station and informs the transmitting station that the receiving station has received a transmitted packet.

13. The transmitting station of claim 8, wherein the transmitting station comprises an access point (AP).

14. The transmitting station of claim 8, wherein the wireless LAN complies with an IEEE 802.11e standard regarding quality of service (QoS).

15. A computer readable recording medium having recorded thereon a computer program executable by a processor to perform:
   determining whether a packet, which does not expire during a current transmission opportunity (TXOP) and will expire before a next TXOP is secured, exists or not based on a time-to-live (TTL) of the packet;
   if it is determined that the packet does not expire during an expansion of the current TXOP, expanding the current TXOP; and
   transmitting the packet to a receiving station.

* * * * *